United States Patent
Untermann et al.

(10) Patent No.: US 9,041,320 B2
(45) Date of Patent: May 26, 2015

(54) PORTABLE, ELECTRIC WORK APPARATUS

(71) Applicant: Andreas Stihl AG & Co. KG, Waiblingen (DE)

(72) Inventors: Arne Untermann, Remshalden (DE); Markus Maier, Leutenbach (DE); Ante Hamersmit, Waiblingen (DE); Christian Renz, Biberach (DE); Johannes Menzel, Rechberg (DE); Ina Schneider, Stuttgart (DE); Jochen Luz, Waiblingen (DE); Jens Kloeker, Waiblingen-Bittenfeld (DE); Harald Mang, Winnenden (DE); David Hampe, Stuttgart (DE); David Kraetzig, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 156 days.

(21) Appl. No.: 13/936,760

(22) Filed: Jul. 8, 2013

(65) Prior Publication Data

US 2014/0007435 A1  Jan. 9, 2014

(30) Foreign Application Priority Data

Jul. 6, 2012 (DE) .......................... 10 2012 013 321

(51) Int. Cl.
*H02K 7/14* (2006.01)
*A01G 3/053* (2006.01)
*H02K 7/02* (2006.01)

(52) U.S. Cl.
CPC *A01G 3/053* (2013.01); *H02K 7/02* (2013.01); *H02K 7/145* (2013.01); *Y02E 60/16* (2013.01)

(58) Field of Classification Search
CPC ........................................................ H02K 7/02
USPC ............................................... 318/3, 34, 558
See application file for complete search history.

(56) References Cited

U.S. PATENT DOCUMENTS

| 6,158,302 A | 12/2000 | Becker et al. |
|---|---|---|
| 6,651,348 B1 * | 11/2003 | Steinmann ...................... 30/392 |
| 7,036,478 B2 | 5/2006 | Momosaki et al. |

FOREIGN PATENT DOCUMENTS

| DE | 1 917 103 U | 6/1965 |
|---|---|---|
| EP | 2 189 055 A1 | 5/2010 |
| WO | WO 2011/154041 A1 | 12/2011 |

* cited by examiner

*Primary Examiner* — David S Luo
(74) *Attorney, Agent, or Firm* — Walter Ottesen P.A.

(57) ABSTRACT

The invention relates to a portable work apparatus having a housing and a work tool which is driven by an electric motor via a gear assembly. A flywheel which rotates about a rotational axis is arranged in the drive train between the electric motor and the gear assembly, which flywheel is connected fixedly to an output shaft so as to rotate with it, which output shaft protrudes into a gear assembly space and has a drive pinion. The output, shaft and the flywheel are mounted in the housing by two bearing locations, the rotational axis of the flywheel and a motor shaft of the electric motor lying coaxially with respect to one another, and the motor shaft of the electric motor being connected fixedly to the flywheel so as to rotate with it. The electric motor is fixed in the housing exclusively via a torque support.

20 Claims, 4 Drawing Sheets

PORTABLE, ELECTRIC WORK APPARATUS

CROSS REFERENCE TO RELATED APPLICATION

This application claims priority of German patent application no. 10 2012 013 321.9, filed Jul. 6, 2012, the entire content of which is incorporated herein by reference.

FIELD OF THE INVENTION

The invention relates to a portable work apparatus having a housing and a work tool which is driven by an electric motor via a gear assembly.

BACKGROUND OF THE INVENTION

DE 1 917 103 U discloses a work apparatus which is configured as a hedge trimmer and in which the gear assembly for driving the cutting blades is driven by a shaft, on which a flywheel is fastened. The rotational axis of the flywheel and the main rotational axis of the gear assembly lie at right angles with respect to one another, a drive pinion of the drive driving a helically toothed ring gear of the gear assembly. The loads which occur in a hedge trimmer during the cutting operation or during any possible blocking of the blades have to be absorbed by the bearings of the drive.

In electric hedge trimmers, the driving electric motor is arranged in the housing of the work apparatus, the construction and the design of the electric motor being provided in such a manner that the bearing loads which are induced by the cutting fittings and the gear assembly during operation of the hedge trimmer can foe absorbed by the bearings of the electric motor. The electric motors and the bearings thereof are designed in accordance with the use as a hedge trimmer drive.

SUMMARY OF THE INVENTION

It is an object of the invention to provide a portable work apparatus with a compact overall design, in which the bearing loads of the drive can be kept away from an electric motor of the drive unit.

The handheld work apparatus of the invention includes; a housing at least partially defining a gear assembly space; a gear assembly; a work tool; an electric motor having a motor shaft and configured to drive the work tool via the gear assembly; a flywheel configured to rotate about a first rotational axis and arranged between the gear assembly and the electric motor; an output shaft protruding into the gear assembly space and having a drive pinion; the flywheel being fixedly connected to the output shaft so as to rotate therewith; a first and a second bearing location arranged in the housing; the motor shaft defining a second rotational axis; the output shaft and the flywheel being mounted in the housing via the first and the second bearing locations in such a manner that the first rotational axis of the flywheel and the second rotational axis of the motor shaft are coaxial; the flywheel being fixedly connected to the motor shaft so as to rotate therewith; a torque support; and, the electric motor being further fixed in the housing exclusively via the torque support.

First of all, it is provided to mount the output shaft and the flywheel in the housing via two bearing locations. Here, the rotational axis of the flywheel and a motor shaft of the electric motor are aligned in such a manner that they lie approximately coaxially with respect to one another. The motor shaft of the electric motor is connected fixedly to the flywheel so as to rotate therewith, and the electric motor itself is supported in the housing only via a torque support.

Since the electric motor is supported only via a torque support and, in addition to the fixing of the motor shaft on the flywheel, it does not experience any further fixing within the housing of the work apparatus, the bearings of the electric motor remain substantially free of radial, forces of the gear assembly, with the result that simple standard motors can be used for driving the gear assembly in the work, apparatus. The torque support ensures that the stator of the electric motor does not rotate when starting up; the torque support ensures the output of the torque from the electric motor to the gear assembly, without radial or axial impact loading of the motor bearings occurring.

The bearing locations expediently lie at a spacing from one another in the direction of the motor shaft, with the result that secure support of radial forces in the gear assembly is achieved.

The motor shaft is connected to the flywheel in an axially captive manner, the motor shaft being plugged into a hub of the flywheel disk. The plugging of the motor shaft into the hub produces not only a drive connection, but also axially fixes the electric motor in the housing. The mounting of the electric motor in the housing by simple inserting of the motor shaft into the flywheel ensures that the rotational axis of the motor shaft lies coaxially with respect, to the rotational axis of the flywheel, without the bearings of the motor or the gear assembly being loaded by any possible axial offset.

The torque support in the housing is expediently formed by a bearing plate of the electric motor. The bearing plate lies in the housing in a rotationally fixed manner. The bearing plate can be supported in the circumferential direction in a simple manner by engagement of a housing projection or the like, without axial, or radial forces being exerted on the motor shaft. To this end, one or more cutouts are provided in the circumference of the bearing plate, into which cutouts projections of the housing protrude.

If the bearing plate is manufactured from an elastic material, the torque support is an elastic torque support with the effect that jolts and impacts in the drive train are damped.

The bearing plate is expediently arranged between the electric motor and the flywheel disk, the bearing plate being fixed, in particular, on the end side of the electric motor. Here, the flywheel forms a connecting member which transmits torque between the output shaft on one side and the motor shaft, of the electric motor on the other side.

The flywheel is received in a rotational space which is formed in the housing, whereas the gear assembly is received in a gear assembly space which is formed in the housing. Here, the bearing plate advantageously forms a wall which delimits the rotational space with respect to the electric motor.

The rotational space of the flywheel is advantageously provided in an apparatus carrier of the housing, a circumferential wall of the rotational, space being formed at least partially in one piece on the apparatus carrier.

In one practical embodiment of the invention, the circumferential wall is formed via a first wall section on the main carrier and a second wall section of the circumferential wall is provided on a separate housing part which completes, preferably closes, the circumferential wall of the rotational space in the main carrier during assembly of the housing.

One of the bearing locations is formed by a bearing which is arranged in the bottom of the rotational space, the bearing expediently closing the rotational space with respect to the gear assembly space. A further bearing location can be formed by a bearing which is held in a corresponding plate which is fastened to the apparatus carrier.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
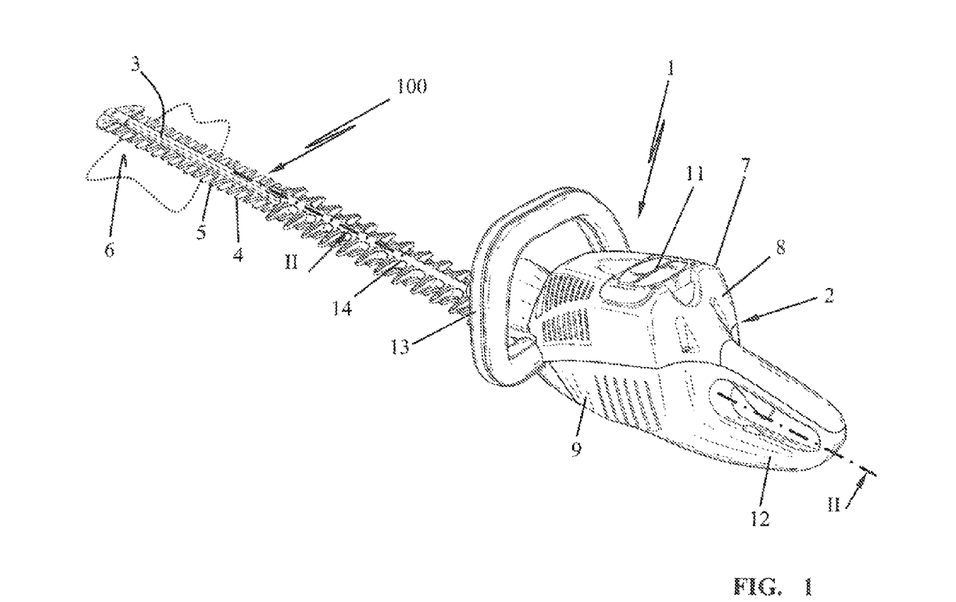
FIG. 1 is a perspective view of an electrically driven hedge trimmer.

The portable work apparatus 1 shown in FIG. 1 is a hedge trimmer 2. As a work tool 100, the work apparatus 1 has a blade bar 3 with two cutting blades 4 and 5 which move to and fro and define a cutting plane 6. A drive unit 10 is received in a housing 7 at one end of the blade bar 3, as is shown in FIG. 2.

The housing 7 has a housing upper part 8 and a housing lower part 9 which surround the drive unit 10 mounted on a main carrier 25. In the embodiment shown, a receiving compartment for a battery 11 is provided in the housing 7; the electric hedge trimmer 2 is a battery-operated hedge trimmer.

In order to hold and guide the work apparatus 1, a rear handle 12 in the longitudinal direction of the work apparatus and a bale handle 13, which is arranged in the front region of the housing 7, are provided on the housing 7. In the embodiment shown, an anti-cutting protection means 14 is fastened on the blade bar 3.

Figure 2:
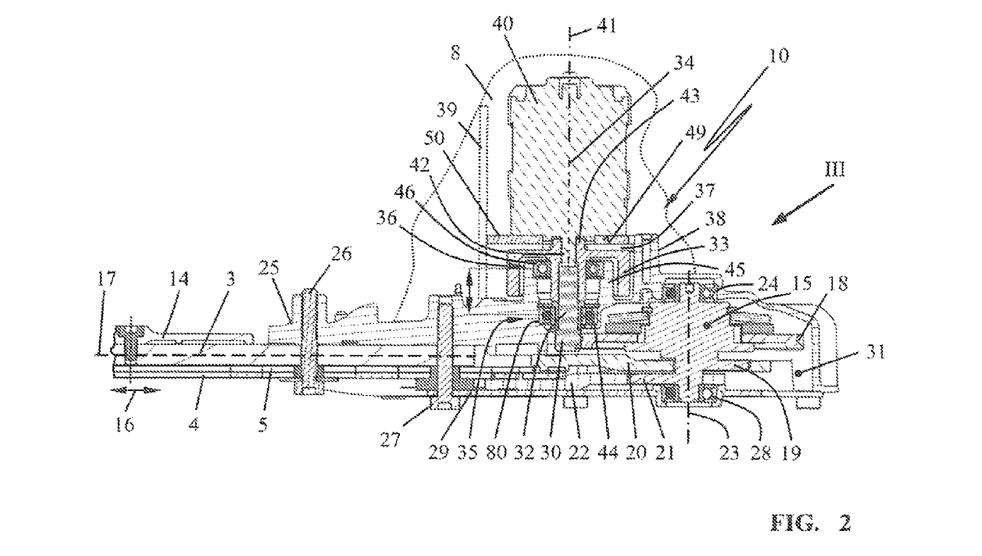
FIG. 2 is a section view through the work apparatus along the line II-II of FIG. 1 and with the housing removed.

As shown in FIG. 2, the cutting blades 4 and 5, which are held on the blade bar 3, are driven so as to move to and fro in the direction of the double arrow 16 by the drive unit 10 via a gear assembly 15 which is shown symbolically as a crank mechanism. Here, the movement path of the cutting blades 4 and 5 runs in the longitudinal direction of the blade bar 3, that is, parallel to the longitudinal center axis 17 thereof.

The gear assembly 15 includes at least one gearwheel 18 which is driven by a drive pinion 30. Two drive cams 19 and 21 each of which drive a connecting rod (20, 22) are provided in a rotationally fixed manner on one end side of the gearwheel 18. Each connecting rod is drive-connected at its end to an associated cutting blade (4, 5), the connecting rod 20 driving the upper cutting blade 5 and the connecting rod 22 driving the lower cutting blade 4 in the embodiment shown according to FIG. 2.

The gear assembly 15 lies in the main carrier 25, to which, the blade bar 3 is fixed by means of fastening screws (26, 27). The main rotational axis 23 of the crank mechanism is held in the main carrier 25 at one end in a bearing 24, in particular an antifriction bearing, whereas the other end of the main rotational axis 23 is held in a further bearing 28 which is held in a terminating plate 29 which is fixed on the main carrier 25. The gear assembly 15 is arranged in a gear assembly space 31 which is formed in the main carrier 25 and is closed by the terminating plate 29.

The drive pinion 30, meshing with the gearwheel 18, of the drive unit 10 is arranged at the end of an output shaft 32 which protrudes into the gear assembly space 31. At the other end which lies opposite the drive pinion 30, the output shaft 32 carries a flywheel 33 which rotates together with the output shaft 32 about a rotational axis 34. The output shaft 33 and the flywheel 33 are mounted in the main carrier 25 of the housing 7 by two bearing locations 35 and 36 which preferably lie at a spacing (a) from one another. Here, the flywheel 33 lies between the gear assembly space 31 and an electric motor 40 in a rotational space 37. The rotational space 37 is delimited on one end by the main carrier 25, on which a part of the circumferential wall 38 of the rotational space 37 is also formed. An inner wall section 39 is formed on the housing upper part 8 of the housing 7, which inner wall section 39 completes the circumferential wall 38 of the main carrier 25 and closes it in the circumferential direction. The circumferential wall 38 and the wall section 39 extend over the height of the flywheel 33 and delimit the rotational space 37 in the circumferential direction.

The first bearing location 36 is defined by a bearing 46 which is preferably configured as an antifriction bearing. The bearing 46 is arranged coaxially with respect to the rotational axis 34 of the flywheel 33 and lies in the end of a cylindrical dome 45 which extends over a part height of the hub 43 of the flywheel 33. The flywheel 33 reaches over the dome 45, the hub 43 of the flywheel 33 extending approximately over the entire height of the circumferential wall 38. The outer ring of the bearing 46 is held in the cylindrical dome 45 which is fixed to the housing, whereas the inner ring of the bearing 46 is penetrated by the hub 43 of the flywheel. The first bearing location 36 therefore forms a bearing 46 for the flywheel 33. The first bearing location 36 preferably lies in the rotational space 37.

The second bearing location 35 is formed by a bearing 44 which is provided in the dividing wall between the rotational space 37 and the gear assembly space 31, that is, lies in the bottom of the rotational space 37. To this end, a bearing seat 80 is formed in the bottom. The bearing 44 which is preferably configured as an antifriction bearing is assigned to the output shaft 32; the output shaft 32 penetrates the inner ring of the bearing 44 and is fixed in a rotationally fixed manner in the hub 43 of the flywheel 33. That end of the output shaft 32 which protrudes out of the bearing 44 carries the drive pinion 30. The bearing 44 closes the gear assembly space 31 with respect to the rotational space 37.

The second bearing location 35, namely the bearing 44, lies in the base region of the cylindrical dome 45. The end of dome 45 is open to the rotational space 37 and is closed by the bearing 46 of the bearing location 36. The gear assembly space 31, which is preferably filled with grease, is closed in a largely tight manner with respect to the rotational space 37 at least by the bearing 44 of the second bearing location 35, with the result that no grease from the gear assembly space 31 can pass into the rotational space 37. The bearing 46 of the first bearing location 36 forms a further shield with respect to the gear assembly space 31, with the result that a passage of grease from the gear assembly space 31 into the rotational space 37 is avoided by the two bearings 44 and 46 which are arranged axially behind one another.

The rotational axis 34 of the flywheel 33 and the rotational axis 41 of the motor shaft 42 of the electric motor 40 lie substantially coaxially with respect to one another. The motor shaft 42 is connected fixedly to the flywheel 33 so as to rotate therewith, to which end the motor shaft 42 is plugged into the hub 43 on that end of said hub 43 which lies opposite the output shaft 32; by way of being plugged into the hub 43, the motor shaft 42 is connected fixedly to the flywheel 33 so as to rotate therewith. The flywheel 33 therefore forms a connecting member which transmits torque between the motor shaft 42 of the electric motor 40 and the output shaft 32 which carries the drive pinion 30 which is arranged in the gear assembly space 31. The output shaft 32 and the motor shaft 42 are also fixed in the hub 43 in the axial direction.

Figure 3:
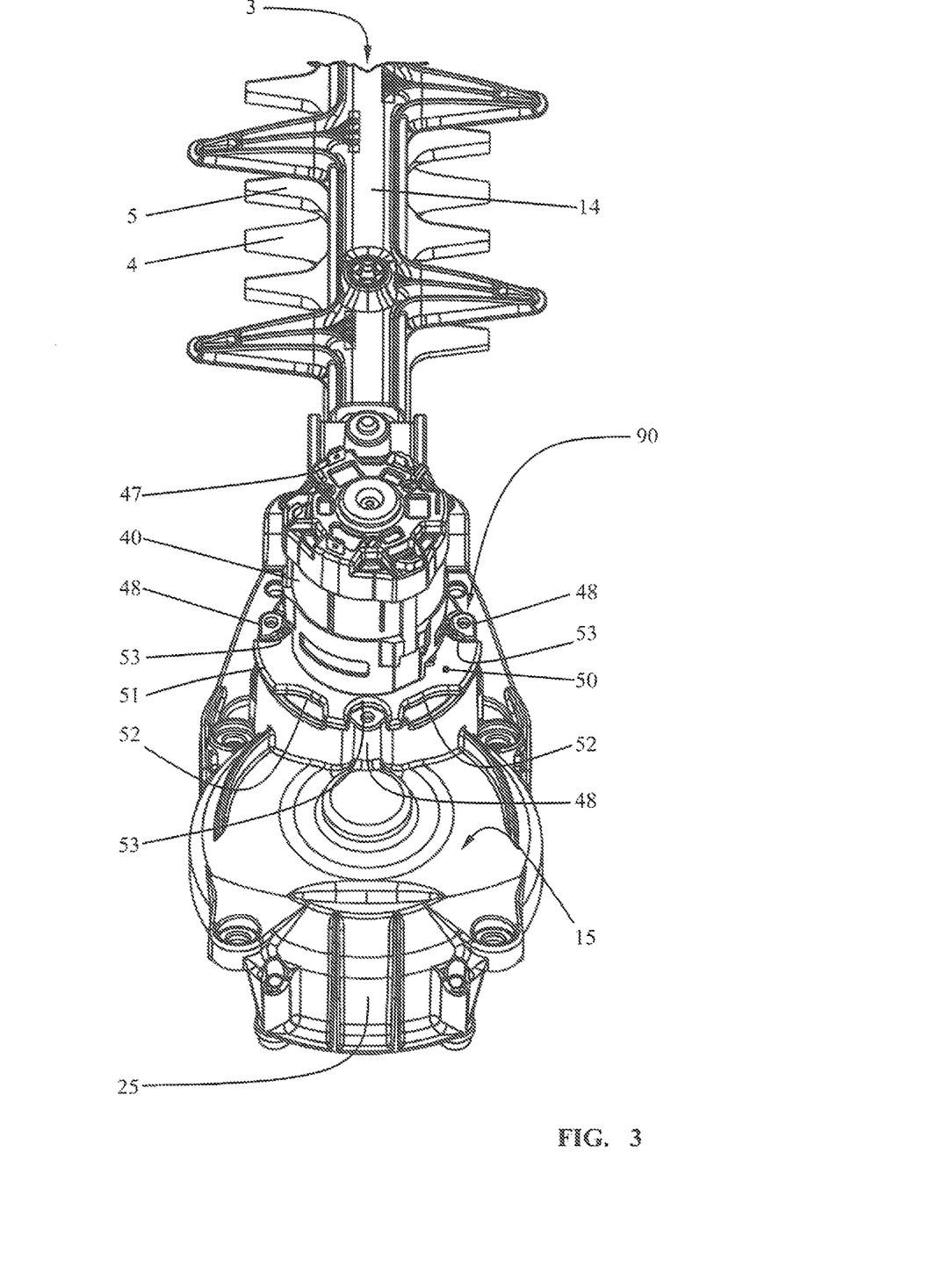
FIG. 3 shows a view in the direction of the arrow III of FIG. 2 toward a main carrier of the drive unit, the main carrier being received in the housing.
Figure 4:
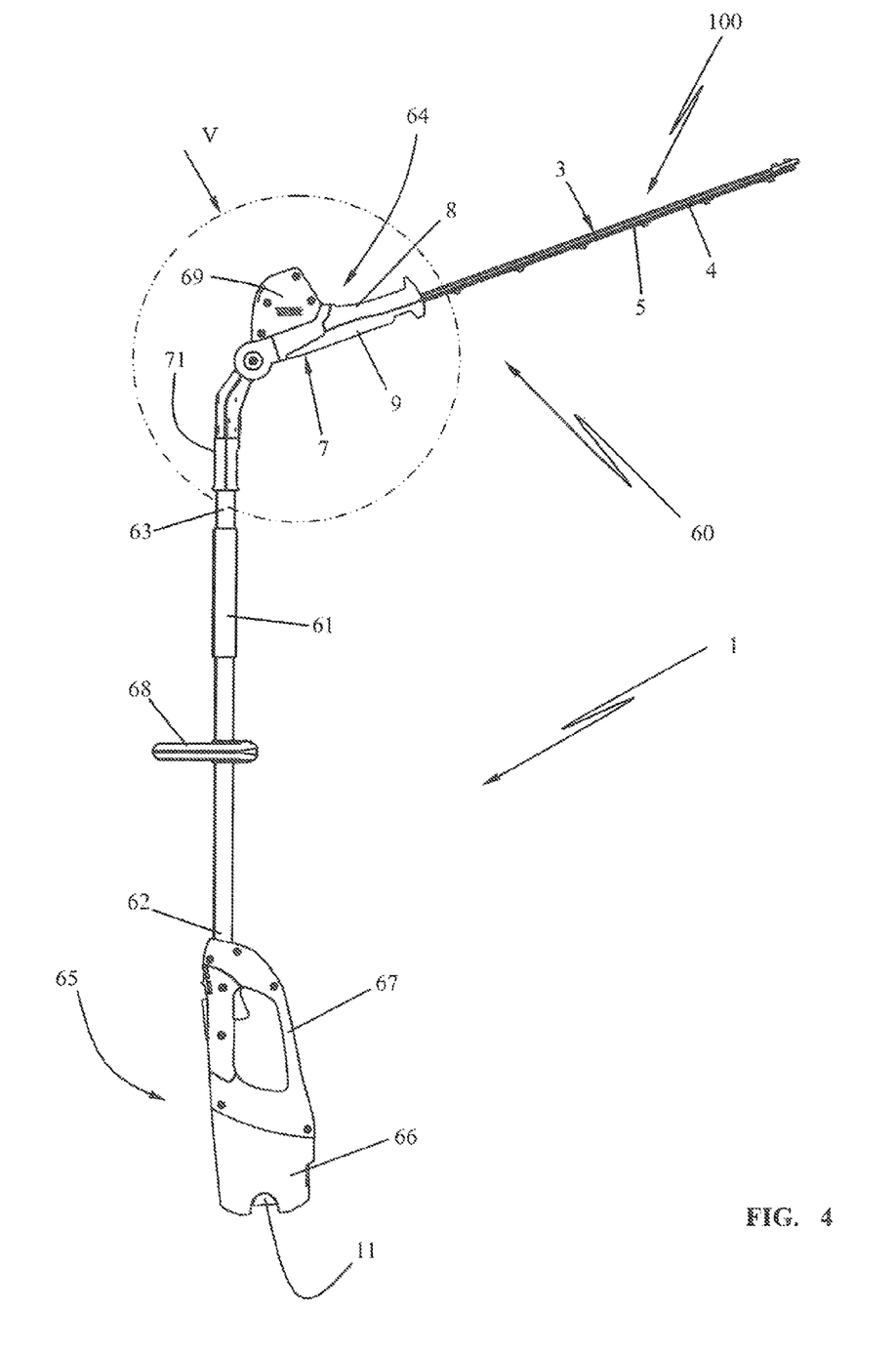
FIG. 4 is a side view of a hedge cutter.
Figure 5:
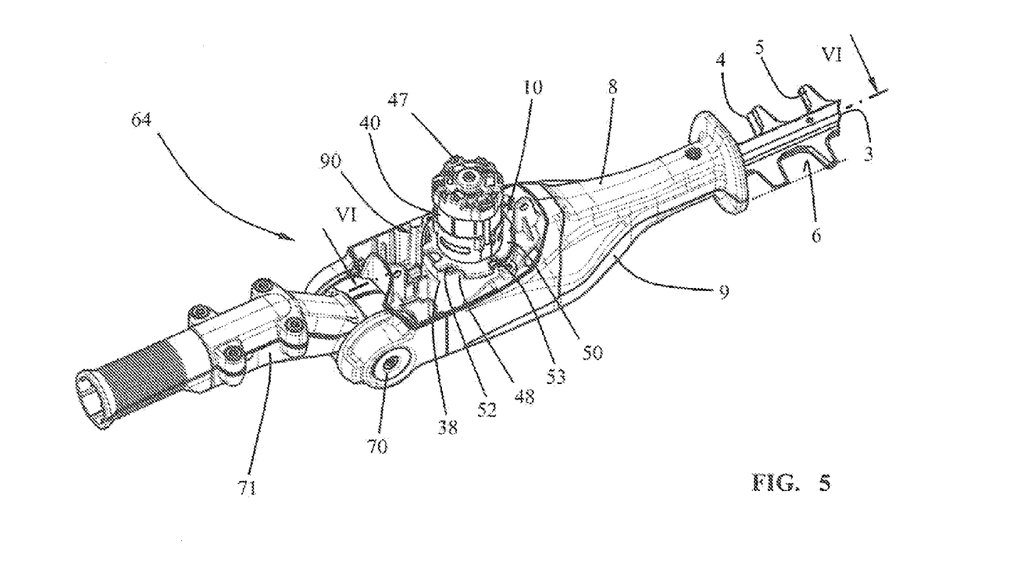
FIG. 5 is a part view showing the drive head of the hedge cutter according to detail V of FIG. 4; and, FIG. 6 is a section through the drive head of the hedge cutter along the line VI-VI of FIG. 5.
Figure 6:
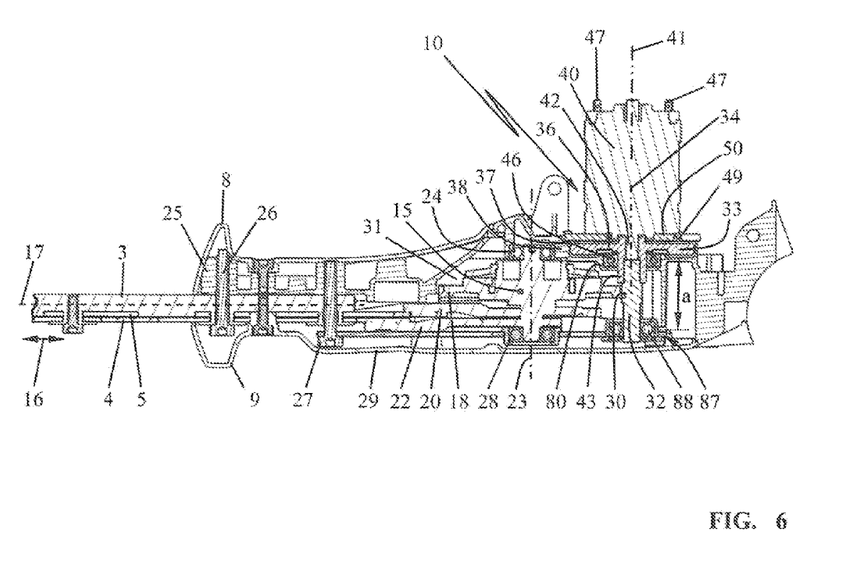

A bearing plate 50, which is fastened on that end side 49 of the electric motor 40 which faces the flywheel 33, lies between the electric motor 40 and the flywheel 33. An arrangement of the bearing plate on that side of the electric motor which faces away from the flywheel can also be advantageous. The bearing plate 50, which is shown in the embodiment, has, as shown in FIG. 3, an approximately circular basic shape and is of disc-like configuration. Cutouts 52 and 53 are formed in the circumferential edge 51 of the bearing plate 50. The cutouts 53 are provided for a first installation position in a first work apparatus 1 (FIGS. 1 to 3) and the cutouts 52 are provided for a second installation position in a second work apparatus 1 (FIGS. 4 to 6). At the same time, there is a damping action as a result of the cutouts (52, 53) when torque jolts occur; the sections of the circumferential edge 51 between two cutouts form torque dampers. In the embodiment according to FIGS. 1 to 3, projections 48 of the housing 7 or of the circumferential, wall 38 engage into the cutouts 53 which are formed as projecting lengths of the circumferential wail 38 which protrude in the direction of the rotational axis 41 of the electric motor 40. The cutouts 52, which are not used in each case, serve for the damping action of the bearing plate 50. The bearing plate 50, which lies in a rotationally fixed manner in the housing 7 as a result of the projections 48, forms a torque support 90 for the electric motor 40. Instead of the bearing plate, a pin, a housing projection, a lug of the motor or the like can also support the electric motor in the rotational direction.

The motor shaft 42, which is plugged in an axially captive manner fixedly into the hub 43 so as to rotate therewith, fixes the electric motor 40 axially in the housing 7, there being at the same time an alignment, of the rotational axis 41 of the motor shaft 42 with respect to the rotational axis 34 of the flywheel 33. In this plugged-in position, the bearing plate 50 of the motor rests on the upper edge of the circumferential wall 38, the projections 48 protruding into the cutouts 53 of the bearing plate 50. The bearing plate 50 therefore lies in a rotationally fixed manner on the main carrier 25 and forms a wall which delimits the rotational space 37 with respect to the electric motor 40 and can be completely or else partially closed. In the embodiment, the wall is interrupted partially by the cutouts (52, 53) and possibly other openings. Since the bearing plate 50 lies in a rotationally fixed manner between the projections 48, the bearing plate 50 forms the torque support 90 of the electric motor 40, without the electric motor 40 having to be fixed to the main carrier 25 or in the housing 7 by way of further fastening measures. The electric motor 40 is fixed in the housing 7 only via the torque support 90.

The bearing plate 50 is preferably formed from a dimensionally stable material, in particular from plastic or from metal. In one particular embodiment of the invention, the bearing plate 50 is formed from an elastic material, with the result that it at the same time forms a torque damper which damps the torque transmitted from the electric motor 40 to the gear assembly in the same way as a reactive moment from the gear assembly 15 to the electric motor 40, for example during blocking of the cutting blades (4, 5) or the like. The bearing plate 50 forms a damper in the drive train between the electric motor 40 and the crank mechanism of the gear assembly 15 or the driven cutting blades 4 and 5.

The rotational axis 41 of the electric motor 40 and the rotational axis 34 of the output shaft 32 stand on the cutting plane 6 conjointly defined by the cutting blades 4 and 5. The main rotational axis 23 of the crank mechanism 15 and the rotational axis 34 of the flywheel 33 lie parallel to one another, the electric motor 40 being arranged between the gear assembly 15 and the blade bar 3. As FIG. 3 shows, the gear assembly 15 forms the rear part of the main carrier 25 in the longitudinal direction of the blade bar 3 (FIG. 2).

The cutouts (52, 53) in the circumferential edge 51 of the bearing plate 50 and the projections 46 of the circumferential wall 38 of the rotational space 37 are advantageously coordinated with one another in such a way that the bearing plate 50 can be placed onto the circumferential wall 38 only in selected rotational positions. This ensures that the electrical connectors 47 of the electric motor 40 lie in the housing 7 in a positionally correct manner, which is advantageous, in particular, if electronically commutated electric motors are used.

The electric motor 40 can be any desired DC motor; the electric motor 40 is advantageously configured as an electronically commutated motor.

Since the bearings (24, 28, 44, 46) of the drive unit are provided in the main carrier 25, the radial and axial forces on the output shaft 32, which are provided during drive, are absorbed by the bearing locations 35 and 36 on the main carrier 25, with the result that the bearings of the motor shaft 42 in the electric motor 40 itself do not have to absorb any relatively great forces. Standard motors can therefore be used as drive means in the work apparatus 1.

FIGS. 4 to 6 show a hedge cutter 60 as work apparatus 1. The hedge cutter 60 comprises a guide wand 61, which is configured as a telescopic wand, and carries an operating unit 65 at one end 62 and a drive head 54 at the other end 63.

The operating unit 65 comprises substantially a housing 66 with a receiving compartment for a battery 11 which supplies voltage to the electric motor which is arranged in the drive head 64. The operating unit 65 has a handle 67 which lies as rear handle such that it is oriented in the longitudinal direction of the guide wand 61. A hoop handle 68 is provided as second handle on the guide wand itself between the drive head 64 and the operating unit 65.

The drive unit 10 which is used in the drive head 64 corresponds to that of the exemplary embodiment according to FIGS. 1 to 3; identical designations are used for identical parts.

The drive head 64 comprises an electric motor 40 (FIGS. 5 and 6) which drives cutting blades 4 and 5 which are guided as work tool 100 on a blade bar 3.

The housing 7 of the drive head 64 comprises a housing upper part 8 and a housing lower part 9, the electric motor 40 being closed by way of a motor cover 69 which is fastened to the main carrier 25 of the housing 7.

The drive head 64 is connected via a rotary joint 70 to a connection piece 71 which receives the end 63 of the guide wand 61. The drive head 64 with its main carrier 25 can therefore be angled away with respect to the guide wand 61, as FIG. 4 also shows.

In accordance with the exemplary embodiment according to FIGS. 1 to 3, the gear assembly space 31 is formed in the main carrier 25, the gear assembly 15 lying between the electric motor 40 and the blade bar 3. Just like the main rotational axis 23 of the gear assembly 15, the rotational axis 34 of the flywheel 33 lies perpendicularly with respect, to the cutting plane 6 which is formed by the cutting blades 4 and 5; the main rotational axis 23 and the rotational axis 34 of the flywheel 33 are preferably oriented vertically with respect to the cutting plane 6. Accordingly, the main rotational axis 23 and the rotational axis 34 can also lie vertically with respect to the cutting plane 6 in the exemplary embodiment according to FIGS. 1 to 3.

In a deviation from the exemplary embodiment according to FIGS. 1 to 3, a further bearing location 87 of the output shaft 32 is formed not in the main carrier 25, but rather in the terminating plate 29. The output shaft 32 therefore penetrates the gear assembly space 31 substantially over its entire height, the output shaft 32 engaging in an axially captive and rotationally fixed manner at one end into the hub 43 of the flywheel 33 and being held at its other end in the bearing 88 of the further bearing location 87. The drive pinion 30 lies between the hub 43 and the further bearing location 87.

The hub 43 of the flywheel 33 is mounted in the main carrier 25 by the first bearing location 36, that is, the bearing 46, the bearing 46 being arranged in a corresponding bearing seat 80 in the bottom of the rotational space 37. Here, the bearing 46 closes the gear assembly space 31 relative to the rotational space 37, with the result that a passage of grease from the gear assembly space 31 into the rotational space 37 is largely avoided.

The configuration of the bearing plate 50 corresponds to that according to FIG. 3, the projections 48 of the housing 7, however, engaging into the associated cutouts 52 in the circumferential edge 51 of the bearing plate 50, as FIG. 5 shows. A torque support 90 is formed by the projections 48 which are fixed to the housing and engage into the cutouts 52, which torque support 90 supports the electric motor 40 in the drive direction, with the result that a driving motor moment can be transmitted to the gear assembly 15.

The mounting of the main rotational axle 23 of the crank mechanism 15 in the gear assembly space 31 corresponds to that in the exemplary embodiment according to FIGS. 1 and 2, just like the mounting of the bearing plate 50 in the main carrier 25 of the housing 7. In a deviation from the exemplary embodiment of FIGS. 1 to 3, the circumferential wall 38 of the rotational space 31 is formed completely in the main carrier 25.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   a housing at least partially defining a gear assembly space;
   a gear assembly;
   a work tool;
   an electric motor having a motor shaft and configured to drive said work tool via said gear assembly;
   a flywheel configured to rotate about a first rotational axis and arranged between said gear assembly and said electric motor;
   an output shaft protruding into said gear assembly space and having a drive pinion;
   said flywheel being fixedly connected to said output shaft so as to rotate therewith;
   a first and a second bearing location arranged in said housing;
   said motor shaft defining a second rotational axis;
   said output shaft and said flywheel being mounted in said housing via said first and said second bearing locations in such a manner that said first rotational axis of said flywheel and said second rotational axis of said motor shaft are coaxial;
   said flywheel being fixedly connected to said motor shaft so as to rotate therewith;
   a torque support; and,
   said electric motor being further fixed in said housing exclusively via said torque support.

2. The work apparatus of claim 1, wherein said first bearing location and said second bearing location are spaced at a distance (a) from each other along said rotational axis.

3. The work apparatus of claim 1, wherein said motor shaft is connected to said flywheel in an axially captive manner.

4. The work apparatus of claim 1, wherein:
   said flywheel has a central hub; and,
   said motor shaft is inserted into said central hub of said flywheel.

5. The work apparatus of claim 1, wherein:
   said electric motor has a bearing plate fixed in said housing so as not to rotate relative thereto; and,
   said torque support is formed by said bearing plate.

6. The work apparatus of claim 5, wherein:
   said bearing plate has a peripheral edge having a plurality of recesses formed therein; and,
   said housing has a plurality of protrusions configured to project into said recesses.

7. The work apparatus of claim 5, wherein said bearing plate is made of an elastic material.

8. The work apparatus of claim 5, wherein said bearing plate is arranged between said electric motor and said flywheel.

9. The work apparatus of claim 5, wherein:
   said electric motor has a front end; and,
   said bearing plate is fixed on said front end of said electric motor.

10. The work apparatus of claim 5, wherein:
    said housing further defines a rotation space; and,
    said bearing plate forms a delimiting wall for said rotation space to said electric motor.

11. The work apparatus of claim 1, wherein said flywheel is a torque transmitting connection element between said output shaft and said motor shaft.

12. The work apparatus of claim 11, wherein:
    said housing further defines a rotation space;
    said gear assembly is accommodated, in said gear assembly space; and,
    said flywheel is accommodated in said rotation space.

13. The work apparatus of claim 12, wherein said bearing plate forms a delimiting wall for said rotation space to said electric motor.

14. The work apparatus of claim 13, wherein:
    said, housing has a first housing part and a second housing part;
    said main carrier is said first housing part of said housing;
    said electric motor has a first end facing away from said flywheel;
    said second housing part is arranged at said first end of said electric motor;
    said circumferential wall has a first wail section and a second wall section;
    said first section of said circumferential wall is formed by said first housing part; and,
    said second section of said circumferential wall is formed by said second housing part.

15. The work apparatus of claim 12, wherein;
    said housing has a main carrier;
    said rotation space is defined by said main carrier;
    said main carrier includes a circumferential wall surrounding said rotation space; and,
    said circumferential wall is at least partially configured as a one-piece with said main carrier.

16. The work apparatus of claim 12 further comprising:
    a bearing configured to form said first bearing location;
    said rotation space having a base;

said bearing being arranged in said base of said rotation space; and, said bearing being configured to close said rotation space to said gear assembly space.

17. The work apparatus of claim 12, wherein said housing has a main carrier, the work apparatus further comprising:

an end plate fixed to said main carrier; and, a bearing held in said end plate and configured to form a third bearing location.

18. The work apparatus of claim 17, wherein said motor shaft is disposed perpendicularly on said cutting plane.

19. The work apparatus of claim 1, wherein:

said work tool is a pair of reciprocating cutting blades;

said cutting blades conjointly define a cutting plane; and, said motor shaft of said electric motor is disposed on said cutting plane.

20. The work apparatus of claim 1, wherein:

said gear assembly defines a main rotational axis; and, said main rotational axis of said gear assembly and said first rotational axis of said flywheel are parallel to each other.

\* \* \* \* \*

UNITED STATES PATENT AND TRADEMARK OFFICE
CERTIFICATE OF CORRECTION

| | | |
|---|---|---|
| PATENT NO. | : 9,041,320 B2 | Page 1 of 1 |
| APPLICATION NO. | : 13/936760 | |
| DATED | : May 26, 2015 | |
| INVENTOR(S) | : A. Untermann et al. | |

It is certified that error appears in the above-identified patent and that said Letters Patent is hereby corrected as shown below:

In the Specification

In column 1:
Line 34: delete "foe" and substitute -- be -- therefor.

In column 4:
Line 2: delete "33" and substitute -- 32 -- therefor.
Line 9: delete "rotational," and substitute -- rotational -- therefor.
Line 10: delete "wail" and substitute -- wall -- therefor.

In column 5:
Line 21: delete "circumferential," and substitute -- circumferential -- therefor.
Line 23: delete "wail" and substitute -- wall -- therefor.

In column 6:
Line 7: delete "46" and substitute -- 48 -- therefor.
Line 30: delete "54" and substitute -- 64 -- therefor.
Line 60: delete "respect," and substitute -- respect -- therefor.

Signed and Sealed this
First Day of December, 2015

Michelle K. Lee
*Director of the United States Patent and Trademark Office*